United States Patent [19]
Burke et al.

[11] 3,930,035
[45] Dec. 30, 1975

[54] EDIBLE COLLAGEN SAUSAGE CASING AND PROCESS FOR PREPARING SAME

[75] Inventors: Noel I. Burke; Arthur M. Dowell, Jr.; Robert D. Talty; Kenneth J. Kremer, all of Danville, Ill.

[73] Assignee: Tee-Pak, Inc., Chicago, Ill.

[22] Filed: Oct. 15, 1974

[21] Appl. No.: 514,686

[52] U.S. Cl. ............... 426/140; 426/105; 426/277
[51] Int. Cl.² .......................................... A23L 1/31
[58] Field of Search ........... 426/105, 140, 276, 277, 426/278, 371, 282, 284, 657

[56] References Cited
UNITED STATES PATENTS
3,833,746   9/1974   Cohly .............................. 426/277

Primary Examiner—Hyman Lord
Attorney, Agent, or Firm—Paul Shapiro; Joseph E. Kerwin; William A. Dittmann

[57] ABSTRACT

This invention relates to an improvement in a process for forming an edible tubular collagen casing wherein a hide collagen source is formed into an aqueous slurry, extruded through an annular die for forming a tubular casing, first tanned with an aluminum tanning agent, and then subsequently tanned with glutaraldehyde and to the resulting product made by the improved process. The improvement for improving the physical characteristics of the edible collagen casing in terms of shirrability, shirred strand characteristics, linking, and frying characteristics comprises:

contacting said extruded casing in a first tanning bath containing from about 0.3 – 1.25% aluminum calculated as $Al_2(SO_4)_3 \cdot 14H_2O$ based on the weight of the bath for a period of from about 2 – 15 minutes;

contacting said first tanned casing in said subsequent tanning bath containing from about 80 – 300 ppm (parts per million) glutaraldehyde for a time sufficient to insure substantially complete dynamic equilibrium between said casing and said bath; and precipitating aluminum in said casing by passing said casing through a bath having a pH of from about 7.8 – 8.2.

8 Claims, No Drawings

EDIBLE COLLAGEN SAUSAGE CASING AND PROCESS FOR PREPARING SAME

BACKGROUND OF THE INVENTION

Natural casings are prepared from the intestines of various edible animals, primarily cattle, hogs, and sheep. The intestines are removed from the slaughtered animal and are thoroughly cleaned by processes well known in the art. Natural casings, which have been thoroughly cleaned, are stuffed with various sausage meat compositions and formed into sausage links in preparation for cooking. The sausages which are thus formed are cooked by the consumer and the sausage casings eaten with the cooked sausage. In the preparation of certain smoked or precooked sausages, such as frankfurters and the like, the sausage is cooked or smoked or otherwise processed by the meat packer to render it edible without further treatment by the consumer.

Prior to about 1925, substantially all sausage casings were natural casings prepared from animal intestines. Since that time, there have been developed several types of synthetic sausage casings, principally of regenerated cellulose, which are used in the preparation of the major portion of frankfurters and similar sausages which are made and sold today. Cellulose casings are used in the preparation of large sausages, such as bolognas, salamis, and the like, and are removed from the sausage by the consumer at the time of final preparation for eating. Regenerated cellulose casings are primarily used in the preparation of frankfurter sausages wherein the casing is stuffed with sausage emulsion, linked, smoked, and cooked, and the casing removed from the finished product to yield skinless frankfurters.

Regenerated cellulose casings have not proven satisfactory for the processing of pork sausage inasmuch as cellulose is not edible with the sausage and does not transmit the fat which is released from the sausage during cooking. As a result, there has been some demand for an artificial sausage casing which is edible and which has the properties desired in a casing to be used in the processing of pork sausages.

Over a period of years, synthetic sausage casings have been made from a collagen source which are suited to the processing of pork sausages as well as larger sausage products. Unlike the regenerated cellulose counterparts, collagen is edible and it suitably transmits the fat from the sausage during cooking. Because of these advantageous properties, collagen casing is finding wide commercial success in the meat processing field.

In the preparation of edible collagen casings, a hide collagen source is converted to an aqueous slurry containing from about 2 – 8% collagen, extruded, coagulated in a salt, tanned, plasticized, and dried.

DESCRIPTION OF THE PRIOR ART

Aluminum tanning of collagen casing has been widely used in the industry for the purpose of giving the extruded collagen casing sufficient strength for subsequent processing. A second tanning is usually conducted with an aldehydic compound, particularly glutaraldehyde; its purpose is to impart sufficient strength to the casing so that it can undergo shirring and stuffing. When the aluminum concentration in the collagen casing is raised to a level sufficient for providing sufficient strength to undergo shirring and stuffing, the casing exhibits extreme springiness in the shirred strand and possesses undesirable pan and deep frying characteristics.

It has been recognized that the presence of aluminum in the casing often leads to poor linking, poor pan and deep fat frying characteristics, as well as poor shirring characteristics in terms of springiness. Additionally, some spices, particularly sage, can react with the aluminum in the casing to produce a complex which imparts discoloration to the casing.

Although there have been many procedures for eliminating the tanning of collagen casing with an aluminum tanning agent, these methods have not been widely used on a commercial basis. The problem then has been to reduce the amount of aluminum in the casing as the aluminum-collagen complex but still produce a casing which can be shirred and suitably fried. It has been proposed to reduce the aluminum complexed with the collagen by treating the tanning casing in a bath containing about 0.1% sodium bicarbonate. The pH of the bicarbonate bath was maintained at about 7.5.

It has also been proposed to reduce the aluminum concentration in the casing (as the aluminum-collagen complex) even though the same quantity of aluminum is present in the casing as a precipitate by the treatment of the tanned casing with a phosphate salt. One of the difficulties with the phosphate process is that it is subject to a high degree of bacterial contamination.

SUMMARY OF THE INVENTION

This invention relates to an improvement in a process for preparing an edible collagen casing from a hide collagen source and to the resulting casing product. The casing made in accordance with this process has outstanding physical characteristics in terms of its ability to shirr without substantial expansion after doffing from the shirring machine, the ability to link on commercial sausage making machines without substantial breakage, the ability to be fried by the deep fat or pan method without producing an aesthetically undesirable product.

The basic process for producing edible collagen casings comprises forming an aqueous collagen slurry, extruding the slurry through an annular die for forming the tubular casing, tanning the casing first with an aluminum tanning agent, and then subsequently tanning the casing with glutaraldehyde. The improvement in this basic process for preparing edible collagen casing and constituting the basis of this invention comprises:

contacting the extruded casing in a first tanning bath containing from about 0.3 – 1.25% of an aluminum tanning agent calculated as $Al_2(SO_4)_3 \cdot 14H_2O$ for about 2 – 15 minutes;

contacting said first tanned casing in a subsequent tanning bath containing from about 80 – 300 ppm glutaraldehyde maintained at a pH of from about 4.1 – 4.5 and for a time sufficient for effecting substantially complete dynamic equilibrium between said bath and said casing; and precipitating aluminum in said collagen casing by passing said casing through a bath maintained at a pH of from about 7.8 – 8.2.

DESCRIPTION OF THE PREFERRED EMBODIMENTS

The collagen source may be derived from hide collagen which has been processed by any of the conventional methods for preparing edible collagen casing. The hide collagen can be unlimed, partially limed such as described in U.S. Pat. Nos. 3,413,130; 3,512,997; 3,627,542; 3,533,809; and 3,535,125 or the hide may be fully limed for making a suitable collagen slurry.

In a preferred embodiment for practicing this invention the hide collagen is fully limed which ordinarily requires from 2 – 4 weeks treatment without accelerators. In this process, animal hide, preferably steer or cattle hides, are cut into suitable pieces and treated with a liming solution for an extended period of time. The hides are fully limed to the extent that the hide has been substantially completely penetrated by the liming solution. A collagen slurry suited for extrusion is prepared from such hides by deliming the fully limed hides by treatment with an acid solution having a pH of 4.5.

An aqueous slurry containing from about 2 – 8% and preferably 4 – 6% collagen is formed either by grinding or comminuting the hide particles to a very small size. The collagen is maintained at a temperature less than about 20°C. (preferably less than 10°C.) during the grinding or comminution by repeated addition of ice to the mixture. The ground collagen thus prepared is treated with lactic acid to swell and burst the collagen fibers as previously described.

The swollen collagen slurry is extruded through an annular die to produce a thin-walled tubular product suitable for use as a sausage casing. In order to obtain maximum strength in the product casing, the collagen slurry is preferably extruded through a die having rotating inner and outer parts of the type well known in the art.

The collagen slurry is extruded through a die into a coagulating bath consisting of a concentrated solution of sodium sulfate or ammonium sulfate. Compositions suited for coagulating the collagen in the extruded casing are well known in the art and can be used in practicing this invention.

The extruded and coagulated collagen casing then is tanned for the purpose of giving the casing sufficient strength to withstand further processing. Although there are numerous processes for tanning collagen casing which do not utilize an aluminum tanning agent, the aluminum tanning process is still widely used in commercial plants. Aluminum tanning agents are widely known in the casing field and all of them can be used here. The aluminum tanning bath must contain a low amount of aluminum tanning agent in the bath and this amount should be from about 0.3 – 1.25% aluminum tanning agent calculated as $Al_2(SO_4)_3 \cdot 14H_2O$. When the aluminum concentration exceeds about 1.25%, it is difficult to precipitate the aluminum from the aluminum-collagen complex in the amount required to produce a shirred casing which is not excessively springy. The springiness of a shirred casing is the amount of expansion incurred by the shirred strand based on its compacted length. For example, a 50 foot collagen casing may have a shirred length of from 6 – 8 inches but a springy casing may have a shirred length of 10 – 20 inches. When the concentration of aluminum in the bath is below about 0.3%, there is insufficient aluminum complexed with the collagen in the casing to give it satisfactory strength for the speeds required for commercial processing up to the second tanning operation. Additionally, the resultant casing typically has poor pan frying characteristics in that the casing often dissolves during frying and there appears to be greater frequency of linker breaks.

The residence time of the casing in the aluminum bath is regulated to insure homogeneity of the aluminum in the casing. The residence time typically is from 2 – 15 minutes with a preferred time of from about 2 – 6 minutes at concentrations of from 0.6 – 1% aluminum. Residence times in excess of 15 minutes do not significantly improve the casing because equilibrium is easily achieved within the residence period when the preferred concentrations of aluminum tanning agent are employed in the bath. When the residence time is less than about 2 minutes, then there often is insufficient time to achieve uniform distribution of the aluminum tanning agent in the collagen casing and insufficient time for effecting sufficient complexing of the collagen to permit processing. Thus, in practicing this invention as the concentration of aluminum in the tanning bath is reduced to about 0.5 or below then the residence time should be increased to permit diffusion of the aluminum into the collagen casing and effect complexing therewith. As is known by those skilled in the art, the rate of reaction and diffusion of the aluminum in the tanning agent is directly proportional to the concentration of aluminum in the bath. On the other hand, the lack of uniformity of distribution of the aluminum tanning agent in the casing is one of the reasons why higher concentrations of aluminum tanning agent are not employed in practicing this invention. For example, casings produced in a tanning bath containing 2% aluminum tanning agent and tanned for 1 minute are undesirable, presumably due to the lack of uniform distribution of the aluminum in the casing. If the residence time is increased to permit uniform distribution of the aluminum in the casing, then the concentration of aluminum complexed with the collagen is too high and is difficult to remove in sufficient quantities to alleviate springiness and undesirable frying characteristics in the casing. The contrast of the tanning operation in this invention is readily ascertained in that the aluminum concentration in prior art processes was maintained between 5 – 20%.

The second tanning step of the first tanned casing is conducted by contacting the casing in a bath having a concentration of from about 80 – 300 ppm glutaraldehyde and a pH from about 4.1 – 4.5. The residence time of the casing in the bath is controlled to insure that dynamic equilibrium is achieved between the bath and the casing. By dynamic equilibrium it is meant that the liquid in the gel casing when extracted from the casing has a concentration of free glutaraldehyde within 10% of the concentration of the glutaraldehyde in the bath. Generally, the residence time in the aldehyde tanning bath is at least 2 minutes and preferably from 2 – 6 minutes.

When the concentration of glutaraldehyde falls below about 80 ppm in a tanning bath, then the resultant casing does not have sufficient strength to withstand thermal shock and has poor frying characteristics. Although a casing tanned in a bath having a concentration in excess of 300 ppm will withstand subsequent processing including shirring and stuffing without substantial breakage, the casing has undesirable frying characteristics compared to a casing produced with a glutaraldehyde concentration within the range specified.

The glutaraldehyde tanning bath is maintained at a pH of from about 4.1 – 4.5. When the pH of the glutaraldehyde tanning bath exceeds 4.5 then the casing has a tendency to develop springiness as noted in the shirred strand and the frying characteristics deteriorate.

After the casing has been subjected to a second tanning operation with glutaraldehyde, then the aluminum can be removed from the casing as the aluminum complex. It is important to note that the aluminum is not physically extracted from the casing but that the quantity of aluminum complexed with the collagen molecule in the casing is lowered by converting the aluminum-collagen complex to a precipitate. In this invention, some of the aluminum is converted to aluminum-hydroxide.

In converting the aluminum in the aluminum-collagen complex to aluminum hydroxide precipitate, the precipitation bath is maintained at a pH of from about 7.8 – 8.2. Typically, the pH is maintained by the use of a buffer, namely a sodium bicarbonate-sodium carbonate buffer system adjusted with sodium hydroxide to maintain the appropriate pH level. Often, sodium carbonate is eliminated from the bath and is generated in situ by adding sodium bicarbonate and sodium hydroxide to the bath.

The concentration of sodium bicarbonate in the bath is maintained in a proportion of from about 0.05 – 0.15% by weight. When higher proportions of sodium bicarbonate are present in the bath, the carbonate(s) form(s) carbon dioxide at an excessive rate which may damage the film. Other buffering systems can be used to maintain the pH in the precipitation bath to about 7.8 – 8.2. For example, sodium acetate or other alkali metal salts of weak acids can be used to effect this result.

In the precipitation of aluminum hydroxide (which, by the way, remains impregnated in the casing) the pH is carefully maintained from about 7.8 and 8.2. In the prior art processes where sodium bicarbonate was used to precipitate the aluminum as aluminum hydroxide, the pH was maintained at about 7.5 – 7.6. As a result, there was a tendency of the casing to develop poor frying characteristics. The same problem, i.e., poor frying characteristics, occurs when the pH of the precipitation bath is raised to above 8.2.

The process conditions set forth in the description above are particularly important in the processing of collagen slurries made from a fully limed hide collagen source. Apparently, the characteristics of a collagen source which has been fully limed are somewhat different than the characteristics of collagen made from a source which has not been subject to a liming treatment or, if limed, subjected to a partial liming treatment. It has been possible in the past to produce acceptable casing which can be shirred and which has reasonably acceptable pan and deep fat frying characteristics. On the other hand, when the same prior art process conditions were applied to a collagen slurry made from a fully limed collagen source, a shirred casing totally unacceptable in terms of its shirrability and fryability was produced. On the other hand, casing made from a collagen source which has not been subjected to a liming treatment or if limed subjected to a partial liming treatment when processed in accordance with the conditions specified herein have superior characteristics to casing heretofore produced by the prior art techniques where casing has been tanned with an aluminum tanning agent.

In a preferred embodiment from about 0.03 – 0.07% of alkali metal and ammonium salts of a strong acid, e.g., sodium chloride, sodium sulfate, potassium sulfate, or ammonium sulfate, are maintained in the precipitation bath. The presence of these salts slightly improve the frying characteristics of the casing.

The following examples are provided to illustrate preferred embodiments of the invention and are not intended to restrict the scope thereof. All percentages are expressed as weight percentages and all temperatures are in degrees Centigrade unless otherwise specified.

EXAMPLE 1

Selected cattle hides from carcasses certified fit for human consumption, weighing about 65 – 75 pounds each, are washed in a large volume of circulating cool (10°C.) water to remove adhering blood. After washing, the hides are fleshed without curing to remove adhering fatty and muscular debris from the flaying operation.

The washed and fleshed hides are treated by immersing the hides in a liming bath consisting of a saturated solution of calcium hydroxide containing about 5% solid particulate calcium hydroxide and about 0.5% sodium sulfhydrate. The temperature of the bath is maintained at room temperature, e.g., 20 – 25°C. The treatment is carried out for a period of 14 days or longer for the purpose of removing most of the hair from the hides.

After liming, the hides are removed from the liming bath and allowed to drain for a period of about 1/2 hour. The limed hides then are gently squeezed between rubber rollers to remove excess liming liquor. The hides then are cut or split in the plane of the hide into two approximately equal portions by weight. The upper or outer hide surface contains all of the hair, hair follicles, and sebaceous and sudorific glands. The inner or corium layer consists essentially of collagen. The outer or hair-containing layer is discarded as unsuitable for use in the preparation of casing but may be used for the formation of leather laminates or coverings.

The corium splits are packed in lime solution and stored at temperatures preferably below about 5°C. until processed. For convenience at the processing plant, the limed hides may be stored in lime solution to prevent bacterial growth until the hides are ready to be used. In preparing the hides for processing, the corium splits are washed with water for a period of about 20 minutes until the pH of the liquor is about 7. At this point, washing of the hides is discontinued and the remaining liquor removed. The splits then are contacted with a dilute edible acid, such as lactic acid, for neutralizing absorbed lime and forming water-soluble calcium salts which can be removed by simple washing.

After the splits are neutralized, they are cut into small pieces, e.g., from about ¼ – 4 inches on the side. The pieces then are immersed into a vat containing about 25% lactic acid in water. The pieces are left in the vat for about three hours to permit the collagen pieces to completely swell. The swollen collagen pieces are removed from the vat and washed with water to remove surface lactic acid. The small pieces of swollen collagen then are converted to a fine pulp by passing them through a comminuter or a meat grinder. In using a meat grinder, three passes are usually required with the smallest pass being about ¼ inch. During grinding or comminuting of the swollen collagen pieces, ice is mixed therewith to maintain the temperature below about 20°C. and preferably below about 10°C. After grinding, the collagen pulp is diluted with water to bring the water content of the slurry to about 90 – 95% by weight.

The slurry then is passed through a bar filter having a clearance of about 0.016 inches for further dispersing the fiber. If desired, the slurry then can be passed through a high shear mixer such as a Votator and a two-stage homogenizer. In this process, these steps often can be eliminated. The slurry then is filtered to remove any undispersed fiber clumps or other solid contaminates.

The filtered slurry is dearated prior to extrusion by storage under vacuum. The dearated slurry then is pumped under pressure through an annular die to produce a thin-walled product adapted for use as a sausage casing. The die preferably is one having counter-rotating inner or outer parts. This type is well known in the art as shown in Becker, U.S. Pat. No. 2,046,541.

The casing is extruded into a coagulating bath consisting of about 40% ammonium sulfate (sodium sulfate can also be used) in water. When the casing is extruded as a thin-walled tube into this concentration of ammonium sulfate, the collagen fibrils are dehydrated and collapsed to form a film which is sufficiently coherent for further processing. Generally, the coagulation bath is circulated both inside and outside the tube to maintain the tube in an inflated condition and to insure proper coagulation of the casing both on the inside and outside.

From the coagulation bath, the casing is passed into a first tanning bath comprising an aqueous solution containing about 1% of aluminum sulfate expressed as $Al_2(SO_4)_3 \cdot 14H_2O$, 0.5% sodium citrate, and 0.5% sodium hydroxide. The tanning bath is formulated so that the sodium citrate (or citric acid) forms a complex with the aluminum sulfate and the sodium hydroxide neutralizes a portion of the aluminum-citrate complex to render the same about ⅓ – ⅔ basic. This results in a tanning bath having a pH of about 4.0. The bath is maintained at a temperature of about 15 – 30°C. and a residence time of the casing in the bath is adjusted to about 5 minutes.

After the casing is tanned with the aluminum complex, it is passed through one or more wash baths to wash out any unreacted tanning or hardening agent and then passed to a second tanning bath containing 200 ppm glutaraldehyde in water. The glutaraldehyde tanning bath has a pH of about 4.3 and is maintained at a temperature of about 15° – 30°C. The residence time of the casing in the glutaraldehyde bath is about 3 minutes for insuring that dynamic equilibrium is achieved between the bath and the casing.

After the casing has been subjected to a second tanning operation, it is removed from the bath and passed through one or more wash baths to wash out any unreacted glutaraldehyde. The casing then is passed through a plasticizing bath containing about 3% glycerin, 0.1% sodium bicarbonate, and sufficient sodium hydroxide to raise the pH to 8.0. The aluminum-collagen complex is partially destroyed in this bath by the precipitation of aluminum as aluminum hydroxide. The dwell time in the bath is about 2½ minutes.

After the casing leaves the plasticizing bath, it is dried, shirred, and packaged. The casing shirrs extremely well and the resultant casing does not have the typical springiness associated with casing tanned with higher quantities of aluminum. The casing also possesses excellent pan frying and deep fat frying characteristics. Criteria used in judging the performance of sausage casing in pan frying and deep fat frying are frequency of breakage and the type of breakage (either small splits or butterfly) or extrusion of the sausage meat through the ends of the casing due to excessive shrinkage.

EXAMPLE 2

The process of Example 1 is repeated except that after the corium splits are washed to remove surface lime as measured by a liquor pH of about 7. They are then delimed by converting the lime to a water-soluble calcium salt. Deliming is effected by contacting the splits with a dilute aqueous acid solution having a pH between about 4 and 5.5. The dilute aqueous acid solution can be formed by dissolving an edible acid, e.g., lactic acid, hydrochloric acid, acetic acid, ethylene diamine tetraacetic acid, or ammonium chloride in water. Ammonium chloride is generally preferred to stronger acids because it is easier to maintain appropriate pH in the deliming step. Deliming of the hide is continued until the acid end point in the center of the hide is less than about 5.5. The end point is conveniently measured by phenol red. A deliming solution having a pH below about 4.0 is not preferred because the casing begins to swell in these solutions and, therefore, it becomes more difficult to remove the water-soluble calcium salts or excess acid from the hide. After deliming, the hides are thoroughly washed with water to remove all of the water-soluble calcium salts. Then the delimed hides are chopped into small pieces, e.g., ¼– 4 inches on a side, ground and processed to a final casing product in accordance with the procedures of Example 1.

The casing has excellent shirring characteristics in that it shirrs well without breakage, has excellent resistance to expansion after shirring and a 50 foot length of casing has a shirred length of from about 6 – 8 inches. Pan frying and deep frying characteristics of the casing are considered to be very good.

EXAMPLE 3

The procedure of Example 1 is repeated except that partially limed hides are substituted for the fully limed hides. The conversion of partially limed hides to a collagen slurry suited for extrusion is well known in the art and is taught in Example 1 of U.S. Pat. No. 3,413,130. All other processing conditions remain the same as in Example 1.

The resulting casing exhibited similar characteristics to the casing described in Example 2 in that it had excellent shirrability without substantial expansion after shirring, excellent pan frying and deep frying characteristics with little to no breakage.

EXAMPLE 4

Ten plant runs are made with the collagen slurry described in Example 2. The conditions for processing the extruded casing are varied in accordance with the values in the table below.

TABLE I

| Run | % Al. | Residence Time | PPM Glutaraldehyde | Sodium Bicarbonate | Shirring | Pan Frying | Deep Fat Frying | Remarks |
|---|---|---|---|---|---|---|---|---|
| 1 | 1.0 | 1¼ Min. | — | — | — | — | — | Did not make it through machine |
| 2 | 2.0 | 2½ Min. | 60 pH 7.0 | 0.05% | very springy | good | extruded ends | springy casing & deep fat fry test not good |
| 3 | 2.0 | 2½ Min. | 300 pH 4.3 | 0.05% pH 8.5 | very springy | good | extruded ends | springy casing & deep fat fry test not good |
| 4 | 1.0% | 5 Min. | 60 pH 8.5 | 0.05% pH 8.5 | slightly springy | very poor | extruded ends | Did not pan or deep fat fry |
| 5 | 2.0% | 2½ Min. | 400 pH 7.0 | 0.1% pH 8.3 | slightly springy | good | extruded ends | Did not deep fat fry |
| 6 | 1.0% | 2½ Min. | 150 pH 7.8 | 0.05% pH 7.8 | slightly springy | good | extruded ends | Did not shirr well or deep fat fry |
| 7 | 1.0% | 2½ Min. | 160 pH 7.0 | 0.05% pH 8.5 | slightly springy & sticky | good | extruded ends | Did not shirr well — Very sticky |
| 8 | 1% | 5 Min. | 200 pH 4.3 | 0.1% pH 7.5 | springy | good | good | Springy |
| 9 | 1% | 5 Min | 200 pH 4.3 | 0.1% pH 8.5 | poor | poor | poor | Slightly springy sticky — pan fry breaks |
| 10 | 1% | 5 Min. | 200 pH 4.3 | 0.1% pH 8.0 0.05% Na$_2$SO$_4$ | Excellent | Excellent | Excellent | Shirred well with better deep fat frying than casing in Example 2 |

The above results show that when the aluminum concentration in the casing has not been allowed to attain equilibrium, as noted at the 1% aluminum concentration and 1¼ minute residence time, the casing does not have sufficient strength to undergo further processing. On the other hand, if the aluminum concentration is too high, e.g., 2% or above, and even though the residence time is at a minimum, the resulting casing is springy and has poor deep fat frying characteristics.

With regard to the glutaraldehyde tanning operation it is noted that as the glutaraldehyde concentration in the second tanning bath falls below about 80 ppm, the casing does not pan or deep fat fry as well as casing prepared with slightly higher concentrations of glutaraldehyde. When the concentration of glutaraldehyde is too high (400 ppm) then the casing does not deep fat fry. The above results also show the importance of controlling the pH in the glutaraldehyde tanning bath for obtaining acceptable shirrability and frying characteristics. When the pH of the precipitation bath is too low, e.g., 7.5., the casing has a tendency to be springy, e.g., shirred lengths may range from 10 – 12 inches for a 50 foot strand.

With regard to the precipitation bath it is noted that when the pH is too high, e.g., above about 8.2, then the casing has a tendency to be sticky and has poor pan frying characteristics. When the pH is too low, e.g., below about 7.8, then poor pan frying characteristics are noted in the casing. Also, the casing tends to be springy.

Run 10 shows that the addition of a strong acid salt of an alkali metal, e.g., sodium sulfate, at a conncentration of about 0.05% by weight of the bath slightly improves the frying characteristics of the casing.

We claim:

1. A process for preparing an edible collagen sausage casing wherein a collagen slurry is formed from a collagen source, extruded through an annular die, coagulated, first tanned in a bath with an aluminum tanning agent and subsequently tanned with glutaraldehyde which comprises, conducting said first tanning of said collagen by contacting said casing in a tanning bath containing from 0.3 – 1.25% aluminum calculated as Al$_2$(SO$_4$)$_3$ . 14H$_2$O for about 2 – 15 minutes;

conducting said subsequent tanning of said first tanned casing by contacting said casing in a bath containing from 80 – 300 ppm glutaraldehyde and having a pH of from about 4.1 – 4.5 for a time sufficient to effect substantially complete dynamic equilibrium between said casing and said bath;

precipitating uncombined aluminum in said tanned casing by passing said tanned casing through a bath at a pH of 7.8 – 8.2, and then drying said tanned casing after precipitating said aluminum.

2. The process of claim 1 wherein said collagen is derived from fully limed hides.

3. The process of claim 2 wherein the aluminum salt in said first tanning bath is complexed with an organic acid and rendered partially basic by treatment with alkaline material.

4. The process of claim 3 wherein the residence time in said tanning bath is at least 2 minutes.

5. The process of claim 3 wherein said precipitation of said aluminum is effected in a bath containing from 0.05 – 0.15% sodium bicarbonate.

6. The process of claim 4 wherein said bath for effecting said precipitation of said aluminum contains sodium carbonate.

7. The process of claim 6 wherein said aluminum tanning agent is present in said bath in a proportion of from 0.6 – 1% by weight.

8. An edible collagen casing produced in accordance with claim 1.

* * * * *